Patented Nov. 20, 1945

2,389,415

UNITED STATES PATENT OFFICE 2,389,415

CONDENSATION PRODUCTS OF THE MODIFIED UREA-ALDEHYDE TYPE

Gaetano F. D'Alelio, Pittsfield, Mass., assignor to General Electric Company, a corporation of New York No Drawing. Application February 17, 1939, Serial No. 256,998

16 Claims. (Cl. 260—70)

This invention relates to new and useful compositions of matter comprising new reaction products and to the production of the same. The invention is concerned more particularly with condensation products obtained by reaction of an amide, an aldehyde and an aldehyde-reactable organic amphoteric substance free from polypeptide linkages. Specifically the invention relates to new and useful compositions of matter comprising a resinous product of reaction, in the absence of a protein, of ingredients comprising (1) a polyamide selected from the class consisting of urea, thiourea, phenyl thiourea, malonic diamide, succinic diamide, citric triamide and phthalamide, (2) an aldehyde and (3) a crystalloidal amino compound selected from the class consisting of amino carboxylic acids and salts of the said amino acids. Thus the amino compound employed in practicing the claimed invention may be, for example, a proteinaceous ingredient or protein derivative consisting essentially or substantially of a crystalloidal amino carboxylic acid.

The organic amphoteric substances and their derivatives used in practicing this invention are not to be confused with the proteids and partially hydrolyzed proteids, examples of which are glycinin, zein, casein, legumin, gliadin and phaseolin, merely to mention a few. These proteid compounds are non-crystalloid, water-insoluble bodies having polypeptide linkages and the colloidal properties of the high molecular weight proteins, as exemplified by viscosity and osmotic pressure phenomena. When the proteids or their alkali salts are plasticized, for example with water, alcohol, etc., or when they are reacted with active methylene-containing bodies, in either case plastic compositions are obtained. In contrast with the proteids the amphoteric substances and their derivatives employed in carrying this invention into effect are crystalloids, or, if impure, may be obtained in crystalline form by simple recrystallization processes. They exhibit the properties typical of crystalloids, for example, sharp melting or decomposition temperatures. In solution, the values of their freezing point depressions, boiling point elevations and osmotic pressures can be approximated by simple calculations.

The free amino acids represent the simplest aldehyde-reactable organic amphoteric substances having no polypeptide linkages that are known. Theoretically the simplest possible amino acid would be carbamic acid or amino formic acid, NH$_2$COOH, which, however, is not known to exist in the free state. Derivatives of carbamic acid, such as ammonium carbamate, NH$_2$COONH$_4$, and ethyl carbamate, NH$_2$COOC$_2$H$_5$, are known and are quite stable. Of the amino acids, glycine or amino acetic acid, NH$_2$CH$_2$COOH, is the simplest known to exist in the free state.

It will be noted that such organic amphoteric substances as amino acids, of which glycine is one of numerous examples, contain both an acid group, —COOH, and a basic group, —NH$_2$. The amphoteric substances on ionization give simultaneously two ions, one negatively charged and the other positively charged, leaving a residual molecule with two equal and opposite charges. Ionically, the equilibrium may be represented thus:

NH$_2$CH$_2$COOH+H$_2$O $\rightleftharpoons$ HO.NH$_2$.CH$_2$COOH $\rightleftharpoons$

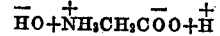

It is known that free or uncombined amino acids (hereinafter for brevity referred to merely as "amino acids"), for example amino carboxylic acids and amino sulfuric acid (amino sulfonic acids), can react with basic substances such as sodium and potassium carbonates and hydroxides, ammonia, trimethyl amine, pyridine, morpholine, aniline, cyclohexylamine, naphthylamine, diethanolamine and the like to give the corresponding salts of the amino acid. These salts are basic not because of the added alkali, but because the —NH$_2$ group of the amino acid has been freed of the neutralizing effect of the —COOH group, this group being neutralized by the added base. Thus, sodium glycinate, NH$_2$CH$_2$COONa, is alkaline in its reactions. Similarly, the original —NH$_2$ group of the amino acid can be neutralized by added acid, such as sulfuric, hydrochloric, acetic, benzoic and the like, resulting in acidic glycine salts. In these salts the —COOH group is free to ionize as an acid, since the influence of the —NH$_2$ group has been removed by the added acid. Thus, glycine hydrochloride, HCl.NH$_2$CH$_2$COOH is acidic in nature.

It is also known that the amino acids can be reacted (condensed) with aldehydes to give methylol derivatives. For example, when formaldehyde and glycine are condensed, acidic methylol glycine, HOCH₂NHCH₂COOH, is obtained. However, if more than one hydrogen of the amino group is replaced by R (alkyl, aryl or aralkyl group), the resulting substituted amino acid will not react with an aldehyde. Thus, taking a substituted glycine wherein one of the amino hydrogens of the original glycine, NH₂CH₂COOH, is replaced by R to produce RNHCH₂COOH, such substituted glycine is capable of reacting with an aldehyde. On the other hand, when both hydrogens of the nitrogen group are replaced by R, the resulting substituted glycine, R₂NCH₂COOH, is incapable of reacting with aldehydes to form methylol derivatives. By an aldehyde-reactable organic amphoteric substance, specifically an aldehyde-reactable amino acid, as used herein, is accordingly meant a substance capable of reacting with an aldehyde to form a methylol derivative, more particularly with reference to an amino acid one wherein at least one hydrogen of the amino group is available for replacement by a methylol grouping.

The amino acids usually are classed according to their chemical nature.

Class I includes the aliphatic, mono-amino mono-carboxylic acids such as glycine or glycocoll, alanine, α-amino butyric acid, α-amino valeric acid, valine or α-isopropyl α-amino acetic acid, glycoleucine, leucine or α-isobutyl α-amino acetic acid, isoleucine or α-amino β-methylethyl propionic acid, serine or β-hydroxy α-amino propionic acid, cysteine or β-thio α-amino propionic acid.

Class II includes the mono-amino dicarboxylic acids such as aspartic acid and glutamic acid.

Class III embraces the isocyclic amino acids such as tyrosine and phenyl alanine.

Class IV includes the heterocyclic amino acids such as tryptophane or α-amino β-indole propionic acid, proline which is α-pyrrolidine carboxylic acid, histidine or α-amino β-imidazole propionic acid and oxy-proline.

Class V includes the diamino mono-carboxylic acids such as arginine or α-amino δ-guanidine valeric acid and lysine or α, ε-diamino caproic acid.

Class VI includes the heterogeneous amino acids, examples of which are the ortho, meta and para amino benzoic acids, beta amino propionic acid, sulfamic acid (NH₂SO₂OH), and beta amino ethyl sulfonic acid (NH₂CH₂CH₂SO₂OH).

I have discovered that the reaction product of an aldehyde-reactable organic amphoteric substance which does not have polypeptide linkages (examples of which have been given above), or one of its derivatives, e. g., a salt thereof, and an aldehyde (e. g., formaldehyde, acetaldehyde, propionaldehyde, butyraldehyde, acrolein, methacrolein, benzaldehyde, etc., or compounds engendering aldehydes such as paraformaldehyde and paraldehyde) can be reacted with amides, more particularly urea, thiourea and other polyamides such as above mentioned, to give new and useful compositions of matter, characteristic properties of which are hereinafter given. If we designate any of the amphoteric substances or their derivatives in the six classes above described as

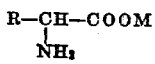

an aldehyde as R'CHO, and an amide as $$-\overset{|}{C}ONH$$

the general equation for the reaction may be written as follows:

(1)

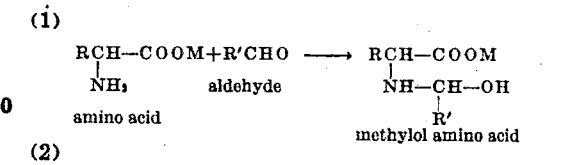

(2)

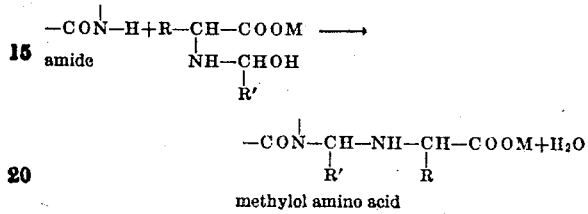

R and R' in the above formulas may be hydrogen (H) or an alkyl, aryl or aralkyl grouping, and M may be hydrogen or any modification that can be substituted for the hydrogen (H) of a —COOH (or —SO₂OH) radical, as hereafter more fully explained.

The above reaction is general and is not limited to condensations involving organic compounds containing only one amide group, or merely to amides of oxygen acids. The amide oxygen atom may be replaced by its equivalent, such as sulfur in the thioamides,

or by the imino group as in the amidines,

or in general by

where X is an element or radical bonded to the carbon atom by a double bond. The reaction does not exclude polyamides, since the number of the amide groups does not affect the nature of the reaction. Carbamide (urea), thiocarbamide (thiourea), phenyl thiocarbamide (phenyl thiourea) and amides of polybasic acids, for example, malonic diamide, succinic diamide, citric triamide, phthalamide and the like, may be used.

Since the reaction between an aldehyde and the amphoteric substance used in practicing this invention depends on the —NH₂ group of the amphoteric substance, the remainder of the amphoteric molecule may be modified in the form of a derivative such as the lithium, barium, calcium, sodium or potassium salts, the ammonium salt, the organic ammonium salts, the esters, the amides or, in general, the modifications that can be introduced to an organic radical such as —COOH or the inorganic radical —SO₂OH. Thus, I have found that I can condense sodium glycinate and formaldehyde to give methylol sodium glycinate, and that the latter can be condensed with an amide such as acetamide to give the sodium salt of N-(methylene glycine) acetamide,

Upon acidification of this sodium salt with an inorganic acid N-(methylene glycine) acetamide, $$\overset{*}{C}H_3CON\overset{*}{H}CH_2\overset{*}{N}HCH_2\overset{*}{C}OOH$$

is obtained. The starred positions in the above formulas and in formulas hereinafter given designate potentially reactive positions.

It is not necessary to isolate the methylol derivatives of the amphoteric substance before condensation with the amide. The aldehyde and the amphoteric substance, specifically an aldehyde-reactable amino acid, may be mixed in a suitable solution, as for example an aqueous solution, and allowed to react, followed by the addition of an amide. The reaction is allowed to proceed either at room temperature or at any suitable elevated temperature up to and including the boiling point of the solution at atmospheric or superatmospheric pressures. Advantageously the reaction is carried out under refluxing (boiling) conditions, the reaction vessel being provided with a suitable reflux column for this purpose.

I have also found that the desired end-products can be obtained in a one-step process by initially mixing all the reactants together, specifically an amide, aldehyde and an aldehyde-reactable organic amphoteric substance free from polypeptide linkages (with or without one of its derivatives) and simultaneously reacting these components. In this case the reaction which takes place may be written thus:

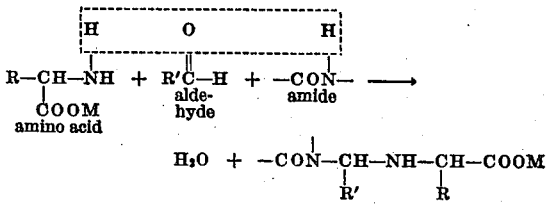

R, R' and M appearing in the above formulas have the same meanings as previously explained with reference to a two-step reaction between the components.

The condensation of the methylol amino acid and amide proceeds under neutral, acid or alkaline conditions, although in certain cases, as for example in the production of certain resinous condensation products, definite predetermined conditions of acidity or alkalinity advantageously may be employed.

In technical processes embodying pH control, considerable difficulty is often encountered in maintaining the definite limits required for certain condensations or reactions. These pH conditions are usually obtained by the addition of substances foreign to the reaction performed. These substances are usually acids, alkalies or salts which function as buffers. One embodiment of my invention is based on my discovery that definite conditions of pH can be readily and easily obtained by using a definite, predetermined adjusted ratio of the herein-defined amphoteric substance to one of its derivatives, for example a sodium or potassium salt thereof, as hereafter more fully described. This control of pH differs fundamentally from the standard or conventional processes in that the control comes from an internal mechanism whereby the molecules of the reactants, as well as the molecules resulting from the reaction, act to control the pH conditions.

In carrying my invention into effect the ratio of the reactants to each other has material influence upon the composition and characteristics of the final product. In the case of monoamides the ratio of reactants is naturally limited, because the amphoteric substance and the amide have only one reactive position. With polyamides, however, the ratio of reactants can be varied over a wide range, due to the plurality of reactive positions in the amide molecule. The effect of mol ratios of reactants upon the nature of the final products will be understood more readily by reference to the table, wherein glycine is mentioned as illustrative of the amphoteric substance, urea as illustrative of the polyamides, and formaldehyde as illustrative of an aldehyde.

| | Mol ratio of reactants | | | Reaction product comprising mainly— |
|---|---|---|---|---|
| | Glycine | Urea | Formaldehyde | |
| A | 1 | $n$ | $2n$ | $\left(-\overset{*}{C}H_2-\overset{*}{N}-CON\overset{*}{H}CH_2\right)_n N\overset{*}{H}CH_2\overset{o}{C}OOH$ |
| B | 1 | $n$ | $n$ | $NH_2\overset{*}{C}ON\overset{*}{H}CH_2-(\overset{*}{N}HCON\overset{*}{H}CH_2)_{n-1}\overset{*}{N}HCH_2\overset{*}{C}OOH$ |
| C | 1 | 1 | 1 | $N\overset{*}{H}_2\overset{*}{C}ON\overset{*}{H}CH_2\overset{*}{N}HCH_2\overset{o}{C}OOH$ |
| D | 1 | 1 | 2 | $HO\overset{*}{C}H_2\overset{*}{N}HCON\overset{*}{H}CH_2\overset{*}{N}HCH_2\overset{*}{C}OOH$ |
| E | 2 | 1 | 2 | $(HOOC-\overset{*}{C}H_2\overset{*}{N}H-CH_2\overset{*}{N}H)_2CO$ |

NOTE.—In the foregoing table $n$ has a numerical value of 1 or more.

When the mol ratios of reactants are relatively low, for example as shown under C, D and E in the table, crystalline bodies are obtained. With an increase in mol ratios of the formaldehyde, or urea and formaldehyde, with respect to the amphoteric substance, the products gradually approach a colloidal state.

The products shown by way of illustration in the table may be described as primary products. They are potentially reactive compounds, the starred positions indicating the favorable points of reaction. They may react with themselves to produce larger molecules or they may be modified in various ways, as by reacting them with other potentially reactive compounds. The $$-\overset{*}{C}OOH$$

group, for example, may be converted to a salt, an ester, an amide, or the like. Also, some of the $$-\overset{*}{N}H_2$$

or the $$-\overset{*}{N}H-$$

groups may be reacted with more aldehyde, whereby in certain cases secondary resinous products may be obtained from crystalline primary products, which secondary products may be used as adhesives or as surface coating materials. They also have other applications, for example in casting, laminating and molding uses, with or without fillers, plasticizers, dyes, pigments or other modifying agents. The

group may be reacted with alcohols to give ether compounds having the grouping ROCH₂NH—, where R is the residue of a monohydric or polyhydric alcohol. In the utilization of any primary condensation products for the preparation of secondary products, I need not isolate such products before further reaction.

In the preparation of primary or secondary products, the reaction may be carried out, if desired, in the absence of a solvent, or in an aqueous solvent, or in a non-aqueous solvent such as dioxane, methyl alcohol, butyl alcohol, glycol monoacetate, ethylene glycol, glycerine, diethylene glycol, ethylene glycol mono-alkyl ethers, and the like.

In the production of resinous materials, it is not necessary to use a pure or homogeneous amphoteric substance or one of its derivatives. Thus, I may use a crude or partially purified mixture of amino acids.

The products of condensation of an aldehyde, an amide and the herein-defined amphoteric substance may be recovered simply by evaporation of the solvent or by precipitation methods, followed by centrifuging or filtration.

In making the ordinary urea-aldehyde resinous condensation products, the condensation catalysts, the buffers used in pH control and the latent acidic curing catalysts are bodies foreign to the reaction. In practicing this invention, wherein an amide, an aldehyde and an aldehyde-reactable organic amphoteric substance free from polypeptide linkages, or its derivative, are condensed, the amphoteric substance (1) can behave as the catalyst for the condensation, and at the same time actually participate in the reaction; and (2) both as a reactant and as a product of reaction the amphoteric substance alone or in the presence of its derivative, can control the pH of the mass, not by a foreign mechanism, but by becoming an integral part of the condensation product. Further, by using a predetermined adjusted ratio of amphoteric substance to that of, say, an alkaline derivative thereof, a heat-hardenable resinous condensation product of any desired internal acid condition and of controllable curing rate can be obtained.

Taking glycine and sodium glycinate as illustrative of an amphoteric substance and of an alkaline derivative thereof, the following diagram shows the step-by-step changes which take place when each reacts first with an aldehyde, specifically formaldehyde, and then with an amide, specifically urea. (It will be noted that the second reaction shown in the right-hand column is a reaction, in the absence of a protein, between ingredients including an N-methylolglycine salt, specifically the sodium salt of N-methylol glycine, and urea.)

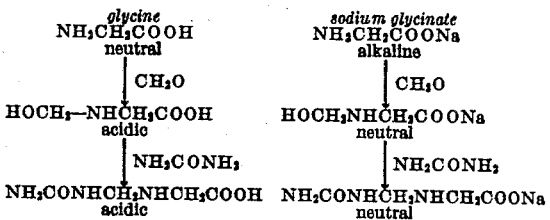

As previously pointed out, glycine, which is neutral, or sodium glycinate, which is alkaline, reacts with formaldehyde to give acidic methylol glycine, HOCH₂NHCH₂COOH, and neutral methylol sodium glycinate, HOCH₂NHCH₂COONa, respectively. However, sodium glycinate is much more reactive than glycine. Hence, by taking a solution formed of, for example, 1 mol urea, 1 mol formaldehyde, ½ mol glycine and ½ mol sodium glycinate, the alkaline glycinate condenses with the formaldehyde and the urea more rapidly than the glycine, producing a neutral molecule. At the same time the glycine also condenses with the urea and formaldehyde to produce acidic molecules. In this way there is obtained a solution with a definite pH value for a particular mixture of condensation products, specifically a mixture consisting of ½ mol of methylene glycine urea,

and ½ mol of the sodium salt of methylene glycine urea, NH₂CONHCH₂NHCH₂COONa. On the other hand, if the original glycine-glycinate ratio were ¾ mol to ¼ mol, the final solution would be much more acidic than in the example above mentioned by reason of the fact that it would consist of ¾ mol of methylene glycine urea and ¼ mol of the sodium salt of methylene glycine urea.

From the foregoing it is evident that a mixture of glycine and glycinate in the described condensation reaction shifts the pH medium from the high or alkaline side toward the low or acid side, the desired range of pH being determined by the ratio of reactants and therefore definitely controllable. It will be understood, of course, that this is true not only of glycine and sodium glycinate, but also of other aldehyde-reactable organic amphoteric substances free from polypeptide linkages, and derivatives thereof, numerous examples of which previously have been given.

In preparing a mixture of the amphoteric substance, as for example glycine, and a derivative thereof, for instance sodium glycinate, to be condensed with an aldehyde and an amide, I need not prepare the glycine and the glycinate separately, but may form a salt of glycine by adding, for instance, a suitable alkali, as for example sodium hydroxide, to glycine itself in such an amount that the desired glycine-glycinate ratio will be obtained.

In order that those skilled in the art better may understand how the present invention may be carried into effect, the following specific examples are given to illustrate the invention. All parts are by weight, and the formalin is a technical grade of aqueous formaldehyde containing approximately 37.1% formaldehyde.

*Example 1*

| | Mols |
|---|---|
| Urea | 1 |
| Formaldehyde | 1 |
| Glycine | 1 |

Seven and five-tenths (7.5) parts glycine, 8.05 parts formalin and 5 parts water were mixed and let stand for 15 minutes. To this solution was added a solution of 6 parts urea in 8 parts water. On addition, the mixture became hot. After about 15 minutes standing, a turbidity appeared in the solution. Part of the water was evaporated at 70° C. and an equal volume of alcohol added. The crystals were filtered from the mother liquor, giving 11.82 parts of a crude condensation product melting with decomposition at about 175° C. The material comprised N-(methylene glycine) urea, NH$_2$CONHCH$_2$NHCH$_2$COOH.

Example 2

| | Mols |
|---|---|
| Urea | 1 |
| Formaldehyde | 1 |
| Sodium glycinate (from reaction of NaOH and glycine) | 1 |

Four parts NaOH were dissolved in a minimum of water and added to 7.5 parts glycine in 5 parts water to prepare sodium glycinate. 8.05 parts formalin were next added, resulting in the liberation of heat. 6 parts urea in 8 parts water were added and the whole heated to 70° C. for ½ hour. The condensation product thereby obtained was insoluble in alcohol. The aqueous solution of the condensation product was twice extracted with an equal volume of alcohol to remove alcohol-soluble material. The aqueous solution was evaporated, leaving a white sticky mass which dried to a hard powder. It comprised the sodium salt of N-(methylene glycine) urea, NH$_2$CONHCH$_2$NHCH$_2$COONa On acidification a product corresponding to that of Example 1 was obtained.

Example 3

| | Mols |
|---|---|
| Urea | 1 |
| Formaldehyde | 2 |
| Glycine | 2 |

Three parts urea in 4 parts water were added to a solution of 8.05 parts formalin and 7.5 parts glycine. Considerable heat was liberated. In about 2 hours a thick, hard cake of crystals was obtained. A solution formed of equal parts alcohol and water was added to make a slurry. This was followed by filtration. After drying at 70° C., 12.26 parts of a white crystalline condensation product were obtained. This product, which melted with decomposition at about 173° C., comprised N,N', di-(methylene glycine) urea, CO(NHCH$_2$NHCH$_2$COOH)$_2$.

Example 4

| | Mols |
|---|---|
| Urea | 1 |
| Formaldehyde | 2 |
| Sodium glycinate (from reaction of NaOH and glycine) | 2 |

Four parts NaOH were dissolved in 5 parts water, and to the resulting liquid were added 7.5 parts glycine and 8.05 parts formalin. To this solution was added 3 parts urea in 4 parts water and the whole heated to 70° C. for ½ hour. The solution was washed with alcohol, the alcoholic extract decanted, followed by concentration of the remaining aqueous solution at 70° C. to obtain 13.65 parts of a white, sticky, gummy mass which dried to a white powder on prolonged heating. The dried condensation product comprised the di-sodium salt of N,N', di-(methylene glycine) urea, CO(NHCH$_2$NHCH$_2$COONa)$_2$. On acidification with hydrochloric or sulfuric acid a product corresponding to that of Example 3 was obtained.

Example 5

| | Mols |
|---|---|
| Thiourea | 1 |
| Formaldehyde | 1 |
| Glycine | 1 |

To 0.99 part glycine was added 1.06 parts formalin, and to it was added 1 part thiourea in 2 parts water to give a clear solution, which was sealed in a suitable container and placed in an oven at 70° C. for 1 hour. It was then allowed to stand at room temperature for 3 days, during which time crystallization occurred. The solution was evaporated at 70° C. to almost dryness, leaving a damp, white, hard cake of crystalline material. The crude crystals were filtered dry by suction and dried at 70° C. 2 parts of a condensation product which melted with decomposition at about 177° C. were obtained. The crude product comprised N-(methylene glycine) thiourea, NH$_2$CSNHCH$_2$NHCH$_2$COOH.

Example 6

| | Mols |
|---|---|
| Thiourea | 1 |
| Formaldehyde | 2 |
| Glycine | 2 |

One and fifty-two hundredths (1.52) parts thiourea, 3.24 parts formalin and 3 parts glycine in 2 parts water were mixed, and on heating for 1 hour at 70° C. resulted in a clear, homogeneous solution. On evaporation, 4.9 parts of a light cream-colored powder having an indistinct melting point were obtained. Foaming and decomposition began at about 144° C. The product, which melted completely at about 158° C. to a thick, viscous, reddish liquid, comprised N,N', di-(methylene glycine) thiourea.

Example 7

| | Mols |
|---|---|
| Thiourea | 1 |
| Formaldehyde | 2 |
| Glycine | 1 |

One and fifty-two hundredths (1.52) parts thiourea, 3.24 parts formalin and 1.5 parts glycine in 2 parts water were mixed and heated at 70° C. for 1 hour, resulting in a cloudy, homogeneous solution which, upon evaporation, yielded a light, cream-colored crystalline powder with an indefinite melting point. Gradual swelling started at about 115° C. and melting was completed at about 130° C. The product comprised N-methylol, N'-(methylene glycine) thiourea.

Example 8

| | Mols |
|---|---|
| Thiourea | 1 |
| Formaldehyde | 2 |
| Glycine | 1 |
| Butyl alcohol | 1 |

One and fifty-two hundredths (1.52) parts thiourea, 3.24 parts formalin, 1.5 parts glycine and 1.58 parts butyl alcohol were mixed, and the mixture then refluxed for ½ hour, resulting in two phases. The solution was evaporated at 70° C., leaving a light yellow, resinous (amorphous) condensation product, in contrast with the crystalline product of Example 7, which was prepared in the absence of butyl alcohol.

Example 9

| | Mols |
|---|---|
| Malonic diamide | 1 |
| Formaldehyde | 1 |
| Glycine | 1 |

Two and four hundredths (2.04) parts malonic diamide, 1.62 parts formalin and 1.5 parts glycine in 2 parts water were mixed and heated at 70° C. for ½ hour, resulting in a clear homogeneous solution. On evaporation to dryness at 70° C. there resulted 3.44 parts of resinous, yellowish powder with an indefinite melting point. At 180° C. on a hot plate the condensation product cured to a soft film. The addition of paraform at 180° C. increased the hardness of the film.

Example 10

| | Mols |
|---|---|
| Malonic diamide | 1 |
| Formaldehyde | 2 |
| Glycine | 1 |

Two and four hundredths (2.04) parts malonic diamide, 3.24 parts formalin and 1.5 parts glycine in 2 parts water were mixed and let stand for 24 to 48 hours, then heated for 1 hour at 70° C. There resulted a clear, homogeneous solution. This solution was evaporated, yielding a yellowish gummy resin that advanced to a fairly soft gummy film upon heating at 180° on a hot plate. The addition of paraform seemed to accelerate this conversion at 180° C.

Example 11

| | Mols |
|---|---|
| Phenyl thiourea | 1 |
| Formaldehyde | 2 |
| Glycine | 1 |

One and fifty-two hundredths (1.52) parts phenyl thiourea, $C_6H_5NHCSNH_2$, 1.62 parts formalin and 0.75 part glycine with 5 parts water were refluxed for about 1 hour. A condensation product with resinous characteristics formed as a cake in the reaction flask on cooling. The supernatant liquid was decanted and a small amount of waxy material also was isolated from the solution by evaporation. The crude condensation product was dried at 70° C., and the dried product melted at 92–100° C.

Example 12

| | Mols |
|---|---|
| Urea | 1.25 |
| Methacrolein | 1.0 |
| Glycine | 1.25 |

One and two-tenths (1.2) parts urea, 1.5 parts glycine, 0.5 part water and 1.12 parts methacrolein were refluxed 7 hours, giving a light yellow condensation product. An equal volume of water was then added and the mixture heated. Nearly all the condensation product went into solution, leaving a very small amount of gummy, orange resinous material. The solution was filtered, then partially evaporated and allowed to crystallize. The crystalline material was removed by filtration. The filtrate was evaporated, leaving a light yellowish-orange amorphous material.

Example 13

| | Mols |
|---|---|
| Urea | 1 |
| Formaldehyde | 2 |
| Glycine | 1 |
| Ethylene glycol | 1 |

When 1.2 parts urea, 3.24 parts formalin, 1.5 parts glycine and 1.24 parts ethylene glycol were mixed, the solution became slightly warm. After cooling to room temperature the mixture was refluxed for two hours, resulting in a clear homogeneous solution, which, upon evaporation at 70° C., yielded a light, pale yellow resin. Upon heating at 180° C. on a hot plate it was first converted to a viscous resinous mass which, on longer heating, became infusible.

Example 14

| | Mols |
|---|---|
| Urea | 1 |
| Formaldehyde | 2 |
| Sodium glycinate (from reaction of NaOH and glycine) | 1 |

To a solution of 1.5 parts glycine and 0.8 part NaOH in 2 parts water there were added 1.2 parts urea and 3.24 parts formalin. The mixture was allowed to stand in a stoppered flask for 1 hour at 70° C., then evaporated, leaving 3.84 parts of a clear homogeneous resinous-appearing mass, which was converted to a dry white powder upon heating at 180° C. on a hot plate.

Example 15

| | Mols |
|---|---|
| Urea | 1 |
| Formaldehyde | 2 |
| Sodium glycinate (from reaction of NaOH and glycine) | 1 |
| Isopropyl alcohol | 1 |

To a solution of 1.5 parts glycine and 0.8 part NaOH in 2 parts water were added 1.2 parts urea, 3.24 parts formalin and 1.2 parts isopropyl alcohol. The mixture was refluxed for 1 hour. The solution was then evaporated at 70° C., leaving 3.71 parts of a light-colored condensation product with resinous characteristics. The resin advanced at 180° C. to a hard powder.

Example 16

| | Mols |
|---|---|
| Urea | 1 |
| Formaldehyde | 3 |
| Glycine | 1 |

When 1.2 parts urea, 4.86 parts formalin, 1.5 parts glycine and 2 parts water were mixed, a clear solution resulted with the liberation of heat and with a gradual increase in viscosity. On evaporation of the solution at 70° C., 3.2 parts of a light greenish, hard, resinous condensation product were obtained. It did not melt definitely, but showed swelling at 124° C. At 180° C., the product was plastic.

Example 17

| | Mols |
|---|---|
| Urea | 1 |
| Formaldehyde | 4 |
| Glycine | 1 |

One and two-tenths (1.2) parts urea, 6.48 parts formalin, 1.5 parts glycine and 2 parts water were mixed, resulting in a clear homogeneous solution with the evolution of heat. The condensation product was concentrated by evaporation at 70° C., leaving 3.65 parts of a pale yellow, hard resin with an indefinite melting point. At 180° C. on a hot plate the condensation product produced a viscous melt which hardened rapidly under the applied heat.

Example 18

| | Mols |
|---|---|
| Malonic diamide | 1 |
| Formaldehyde | 3 |
| Glycine | ½ |
| Sodium glycinate (from reaction of sodium hydroxide and glycine) | ½ |

Two-tenths (0.2) part NaOH in 2 parts water were mixed with 0.75 part glycine (corresponding to a solution of 0.485 part sodium glycinate and 0.375 part glycine). This mixture was added to 2.43 parts formalin and 1.02 parts malonic diamide and let stand at room temperature for about 15 hours, resulting in a clear homogeneous solution. On evaporation of the solution at 70° C., 2.15 parts of a light greenish resin were obtained. At 180° C. the condensation product produced a thick melt, curing to a dry powder.

Example 19

| | Mols |
|---|---|
| Malonic diamide | 1 |
| Formaldehyde | 3 |
| Sodium glycinate (from reaction of NaOH and glycine) | 0.5 |
| Ethylene glycol | 2.5 |

To 0.375 part glycine there was added 0.2 part NaOH in 2 parts water, 0.155 part ethylene glycol, 2.43 parts formalin and 1.02 parts malonic diamide. The mixture was refluxed for 1 hour, leaving a clear, homogeneous, yellow solution. Upon evaporation, a hard, pale green, resinous condensation product which caked at body temperature was isolated.

Example 20

| | Mols (approximately) |
|---|---|
| Urea | 1.0 |
| Formaldehyde | 2.0 |
| Pyridine | 0.025 |
| Pyridine glycinate (from reaction of pyridine and glycine) | 0.025 |

Nineteen parts glycine, 41 parts pyridine and 300 parts water were first mixed and to the solution there were added 1600 parts of exactly neutral formalin (pH 7), followed by the addition of 600 parts urea. The mixture was shaken until solution occurred. The pH dropped to 6.2. The solution was then refluxed for about 2.5 hours, resulting in a clear, water-white solution of increased viscosity. Eighty parts water were then removed by vacuum distillation, leaving an aqueous resinous solution with a resin content of about 45% and a pH of 5.2. Alpha cellulose sheets were impregnated by dipping into the dehydrated resin solution. The sheets were dried at 50° C. for about 20 minutes and were laminated by molding at 130° C., and under a pressure of about 2000 pounds per square inch to give a clear, homogeneous product, the translucency of which depended on the number of superposed sheets comprising the laminations.

The dry impregnated sheets may be first comminuted and ground to any desired mesh to be used in the preparation of other molded products. It is not essential, however, that the filler be impregnated in sheet form, since flock, wood flour, asbestos and the like may be first impregnated and then dried to a satisfactory condition for molding. Pigments and dyes may be added either to the resin syrup or filler to give colored products. Opacifiers such as lithopone, or titanium phthalate, may be used to decrease the transparency of the molded or laminated products, thereby increasing their opacity. In many cases it is advisable to incorporate a mold lubricant with the molding composition.

If the resin solution is dehydrated to a solid content of higher than 50% and then allowed to gel, the solid resin mass may be dried at 50° C. for about 20 hours, followed by sheeting through rolls and molding directly at 130° C. to give clear, transparent molded pieces comparatively free from bubbles and blisters.

Example 21

| | Mols (approximately) |
|---|---|
| Urea | 1.0 |
| Formaldehyde | 2.0 |
| Glycine | 0.035 |
| Sodium glycinate (from reaction of NaOH and glycine) | 0.035 |

Two and six-tenths (2.6) parts glycine were added to 0.7 part NaOH in 20 parts water, and this solution was added to 80 parts of exactly neutral formalin (pH 7). Thirty parts urea were added and the mixture shaken until solution occurred. The mixture was allowed to stand at 35° C. plus or minus 5° C. for 10 hours. After solution occurred the pH was 6.1, which dropped to 4.3 at the completion of the reaction.

The syrup was compounded with alpha flock to give a resin content of 60%, followed by drying at 50° C. for 90 minutes. A hard, translucent disc was produced by molding the dried compound at 135° C. under a pressure of 2000 pounds per square inch. The addition of 5% dimethyl phthalate to the compound gave a molding composition of increased plasticity or flow.

Example 22

| | Mols (approximately) |
|---|---|
| Urea | 1.0 |
| Formaldehyde | 3.0 |
| Glycine | 0.046 |
| Sodium glycinate (from reaction of glycine and NaOH) | 0.046 |

Three and fifty-five hundredths (3.55) parts glycine and 0.95 part NaOH were dissolved in 20 parts water and the solution added to 120 parts exactly neutral (pH 7) formalin. Thirty parts urea were then added with agitation until solution occurred. The pH value of the solution at this point was 6.2. The reaction was allowed to continue at 35° C. plus or minus 5° C. for about 10 hours, ending in a pH of 4.1.

Paper sheets were impregnated with the undehydrated resin syrup to a resin content of 60% and thereafter dried at 50° C. for 90 minutes. The dried sheets were cut up into small squares and molded in the form of a disc at 135° C. under a pressure of 2000 pounds per square inch, producing a very translucent product with a high glossy surface.

Example 23

| | Mols (approximately) |
|---|---|
| Urea | 0.67 |
| Thiourea | 0.33 |
| Formaldehyde | 2.0 |
| Glycine | 0.014 |
| Sodium glycinate (from reaction of NaOH and glycine) | 0.095 |
| Isopropyl alcohol | 0.41 |

The glycine-sodium glycinate mixture was first prepared by adding 1.9 parts NaOH to 4.1 parts glycine in 30 parts water, and to it was added 80 parts neutral formalin, 20 parts urea, 13 parts thiourea and 14 parts isopropyl alcohol. The solution was refluxed for ½ hour and dehydrated to a resin content of about 50% and a final pH of 4.9. Impregnated sheets were laminated, giving laminations which were hard, glossy, water-white and exceptionally translucent.

*Example 24*

| | Mols (approximately) |
|---|---|
| Urea | 1.0 |
| Formaldehyde | 2.0 |
| Glycine | 0.025 |
| Pyridine glycinate (from reaction of pyridine and glycine) | 0.03 |

One and twenty-three hundredths (1.23) parts pyridine were added to 2.07 parts glycine in 25 parts water and the technique as given in Example 20 was followed, using 80 parts neutral formalin and 30 parts urea. After solution of the urea the pH was 5.8 and at the completion of the reaction had dropped to 4.3. Laminations coated and impregnated with the heat-hardened material were translucent and had a glossy surface.

*Example 25*

| | Mols (approximately) |
|---|---|
| Urea | 0.67 |
| Thiourea | 0.33 |
| Formaldehyde | 2.0 |
| Pyridine | 0.043 |
| Pyridine glycinate (from reaction of pyridine and glycine) | 0.056 |
| Isopropyl alcohol | 0.28 |
| Ethylene glycol | 0.10 |

A resinous composition was prepared in accordance with the procedure given under Example 23, using 20 parts urea, 13 parts thiourea, 80 parts neutral formalin, 2.1 parts glycine, 3.9 parts pyridine, 14 parts isopropyl alcohol and 3 parts ethylene glycol. A clear, resinous syrup possessing a very good cure was obtained. The final pH of the syrup was 5.7. Excellent molded articles were produced by dispersing a filler in this resinous material and molding under heat and pressure.

*Example 26*

| | Mols (approximately) |
|---|---|
| Urea | 1.0 |
| Formaldehyde | 2.0 |
| Glycine | 0.0033 |
| Sodium glycinate (from reaction of NaOH and glycine) | 0.05 |

Four parts glycine and 2 parts NaOH were dissolved in 20 parts water and added to 160 parts of exactly neutral formalin, followed by the addition of 60 parts urea. The mixture was agitated until solution occurred, at which point the pH of the solution was 7.43. The solution was refluxed for 2½ hours, followed by dehydration to a resin content of about 50% with a pH of 5.5. The concentrated syrup was used as described under preceding examples, resulting in excellent moldings and bonded laminations.

*Example 27*

| | Mols |
|---|---|
| Pyridine | 2 |
| Formaldehyde | 1 |
| Glycine | 1 |
| Biguanide sulfate | 1 |

To 1.59 parts pyridine and 0.75 part glycine in 4 parts water were added 0.81 part formalin and 1.99 parts biguanide sulfate. The resulting mixture was allowed to stand for about 18 hours at room temperature, resulting in a homogeneous yellow solution, which upon evaporation to dryness yielded an orange-colored, sticky powder.

*Example 28*

| | Mols |
|---|---|
| Acetamide | 1 |
| Formaldehyde | 1 |
| Glycine | 1 |

One part of acetamide, 1.37 parts formalin and 1.27 parts glycine were mixed, resulting in a clear solution which was allowed to stand at room temperature for 48 hours. The solution was evaporated at 70° C., resulting in a light cream-colored material which showed signs of melting with decomposition at about 145° C. and which melted completely at 180° C. The product comprised impure N-(methylene glycine) acetamide, $$CH_3CONHCH_2NHCH_2COOH$$

from which the pure material could be obtained by recrystallization from alcohol or from alcohol-water mixtures. Conversion to the salt derivative is readily accomplished by adding an alcoholic or aqueous solution of an inorganic base. Liquid organic bases may be added directly if so desired. The acetamide in the above example may be replaced by other monoamides, as for example, propionamide, butyramide, caproic acid amide, heptamide, caprylic acid amide, capric acid amide, toluene sulfonamide, benzamide, cyanoacetamide, acetoacetamide, etc. When amides insoluble in the aldehyde are used, the reaction may be facilitated by the use of heat under reflux or by using a mutual solvent aided by heat. Other aldehydes such as acetaldehyde and benzaldehyde, or aldehydes belonging to the unsaturated series, for example, acrolein and methacrolein, may be used.

*Example 29*

| | Mols |
|---|---|
| Acetamide | 1 |
| Formaldehyde | 1 |
| Sodium glycinate (from reaction of glycine and NaOH) | 1 |

Sodium glycinate was prepared by adding 0.68 part NaOH to 1.27 parts glycine in 2 parts water. To the glycinate soution were added 1 part acetamide and 1.37 parts formalin. Heat was liberated from the mixture, and there was obtained a clear, homogeneous solution. Evaporation of this solution at 70° C. resulted in 2.66 parts of a white pasty mass, which was converted to powdered form upon prolonged drying. The product comprised the sodium salt of N-(methylene glycine) acetamide.

Preferred resinous compositions of this invention comprise the reaction product of one mol of a polyamide, for example urea, at least one mol of an aldehyde, as for instance formaldehyde, and not exceeding substantially 0.3 mol of a mixture of an aldehyde-reactable amino acid (e. g., glycine) and a derivative, for instance a salt, of an aldehyde-reactable amino acid, for example sodium glycinate, the mol ratios of the amino acid and the derivative of the amino acid with respect to each other being adjusted to give a predetermined pH. It will be understood, of course, that the salts and other derivatives of aldehyde-reactable amino acids are also capable of reacting with aldehydes since, as previously explained, the reaction between an aldehyde and an amphoteric substance free from polypeptide linkages, specifically an amino acid, which can react with the adehyde, depends upon the —NH₂ group of the amino acid.

Products of this invention are especially suitable for use as fire-retardants, water-repellents and sizings, when applied to wood or the like, or to silk, cotton, wool, synthetic organic fibers, etc., in continuous filament, thread, fabric (woven or felted) or other form. The cellulosic or other fibrous materials to be treated may be surface coated or both coated and impregnated by any suitable means, for example, by spraying with, or immersing in, a solution of the treating agent and thereafter volatilizing the solvent. The resinous condensation products of this invention, alone or in conjunction with other natural or synthetic resinous materials, as for example phenolic resins, alkyd resins, vinyl compounds such as polyvinyl alcohol, polyvinyl acetals, etc., have a wide variety of uses, for instance in the production of laminated and molded products, as casting resins, in paints, varnishes and other protective surfacing materials, in the manufacture of arc-extinguishing tubes capable of evolving an arc-extinguishing gas under the heat of the arc, in the production of wire or baking enamels, and for other uses.

In my divisional application Serial No. 497,682, filed August 6, 1943, and assigned to the same assignee as the present invention, I have claimed products obtained by effecting reaction between ingredients including a salt of sulfamic acid, formaldehyde and a polyamide selected from the class consisting of urea, thiourea, malonic diamide, succinic diamide, citric triamide and phthalamide, and methods of making the same.

What I claim as new and desire to secure by Letters Patent of the United States, is:

1. A composition of matter comprising the resinous product of reaction, in the absence of a protein, of ingredients including (1) a polyamide selected from the class consisting of urea, thiourea, phenyl thiourea, malonic diamide, succinic diamide, citric triamide and phthalamide, (2) an aldehyde and (3) a salt of a crystalloidal amino carboxylic acid.

2. A composition of matter comprising the resinous product of reaction, in the absence of a protein, of ingredients including (1) urea, (2) formaldehyde and (3) a salt of a crystalloidal amino carboxylic acid.

3. A composition of matter comprising the resinous product of condensation, in the absence of a protein, of ingredients including urea, formaldehyde and sodium glycinate.

4. A composition of matter comprising the resinous product of reaction, in the absence of a protein, of ingredients including (1) a polyamide selected from the class consisting of urea, thiourea, phenyl thiourea, malonic diamide, succinic diamide, citric triamide and phthalamide, (2) an aldehyde, (3) a crystalloidal amino carboxylic acid and (4) a salt of a crystalloidal amino carboxylic acid.

5. A composition of matter comprising the resinous product of reaction, in the absence of a protein, of ingredients including (1) urea, (2) formaldehyde, (3) a crystalloidal amino carboxylic acid and (4) a salt of a crystalloidal amino carboxylic acid.

6. A composition of matter comprising the resinous product of condensation, in the absence of a protein, of ingredients including urea, formaldehyde, glycine and a salt of glycine.

7. A composition of matter comprising the resinous product of condensation, in the absence of a protein, of ingredients including urea, formaldehyde, glycine and sodium glycinate.

8. A resinous composition comprising the product of reaction, in the absence of a protein, of ingredients comprising the following components in the stated molar ratios: (1) one mol of a polyamide selected from the class consisting of urea, thiourea, phenyl thiourea, malonic diamide, succinic diamide, citric triamide and phthalamide, (2) at least one mol of an aldehyde, and (3) not exceeding substantially 0.3 mol of a mixture of a crystalloidal amino carboxylic acid and a salt of a crystalloidal amino carboxylic acid, the mol ratios of the said amino acid and of the said salt with respect to each other being adjusted to give a predetermined pH.

9. A heat-curable resinous composition comprising the heat-convertible product of condensation, in the absence of a protein, of ingredients including the following components in the stated molar ratios: one mol urea, at least one mol formaldehyde, and not exceeding substantially 0.3 mol of a mixture of glycine and sodium glycinate, the mol ratios of glycine and sodium glycinate with respect to each other being adjusted to give a predetermined pH.

10. A product comprising the cured resinous composition of claim 9.

11. The process of preparing a resinous composition which comprises effecting reaction, in the absence of a protein, between ingredients comprising the following components in the stated molar ratios: (1) one mol of a polyamide selected from the class consisting of urea, thiourea, phenyl thiourea, malonic diamide, succinic diamide, citric triamide and phthalamide, (2) at least one mol of an aldehyde, and (3) not exceeding substantially 0.3 mol of a mixture of a crystalloidal amino carboxylic acid and a salt of a crystalloidal amino carboxylic acid, the mol ratios of the said amino acid and of the said salt with respect to each other being adjusted to give a predetermined pH.

12. A resinous composition obtained by reaction, in the absence of a protein, of ingredients comprising urea, formaldehyde and glycine, said reaction being effected while the said components are admixed with an alkaline substance.

13. The process which comprises reacting to resin formation a salt of a crystalloidal amino carboxylic acid with an aldehyde and a polyamide selected from the class consisting of urea, thiourea, phenyl thiourea, malonic diamide, succinic diamide, citric triamide and phthalamide, said reaction being effected in the absence of a protein.

14. The process which comprises (1) contacting a salt of a crystalloidal amino carboxylic acid with an aldehyde in the absence of a protein and thereafter (2) effecting resinification, in the absence of a protein, between ingredients including the product of (1) and a polyamide selected from the class consisting of urea, thiourea, phenyl thiourea, malonic diamide, succinic diamide, citric triamide and phthalamide.

15. The process which comprises reacting a salt of glycine with formaldehyde and urea in the absence of a protein.

16. The process which comprises effecting reaction, in the absence of a protein, between ingredients including an N-methylol glycine salt and urea.

GAETANO F. D'ALELIO.